United States Patent
Mehan et al.

(10) Patent No.: US 7,413,785 B2
(45) Date of Patent: Aug. 19, 2008

(54) HEAT-RECOVERABLE FOAM TUBING

(75) Inventors: Ashok Mehan, Newark, CA (US); Rene Jairo Revueltas, Menlo Park, CA (US); Jim J. Imperiale, Fremont, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 108 days.

(21) Appl. No.: 10/637,316

(22) Filed: Aug. 7, 2003

(65) Prior Publication Data

US 2005/0031811 A1     Feb. 10, 2005

(51) Int. Cl.
    *B29D 22/00*     (2006.01)
(52) U.S. Cl. ............... 428/36.91; 428/34.9; 428/36.5; 428/313.5; 428/319.9
(58) Field of Classification Search ............... 428/36.9, 428/36.91, 313.5, 317.3, 317.9, 34.9, 36.5, 428/319.7, 319.9, 343, 344, 354, 356
See application file for complete search history.

(56) References Cited

U.S. PATENT DOCUMENTS

| | | | | |
|---|---|---|---|---|
| 2,027,962 | A | 1/1936 | Currie | 18/55 |
| 3,086,242 | A | 4/1963 | Cook et al. | 18/1 |
| 3,114,374 | A | 12/1963 | Chalfin et al. | 128/465 |
| 3,370,112 | A | 2/1968 | Wray | 264/22 |
| 3,597,372 | A | 8/1971 | Cook | 260/4 |
| 4,656,070 | A | 4/1987 | Nyberg et al. | 428/36 |
| 5,043,115 | A | 8/1991 | Aoshima et al. | 264/54 |
| 5,071,886 | A | 12/1991 | Aoshima et al. | 264/54 |
| 5,287,894 | A | 2/1994 | Shukushima et al. | 138/140 |
| 5,405,665 | A * | 4/1995 | Shukushima et al. | 428/34.9 |
| 5,979,902 | A | 11/1999 | Chang et al. | 277/316 |
| 6,103,152 | A | 8/2000 | Gehlsen et al. | 264/45.4 |
| 6,384,095 | B1 | 5/2002 | Corr et al. | 521/81 |
| 6,403,889 | B1 | 6/2002 | Mehan et al. | 174/120 R |
| 2002/0013389 | A1 | 1/2002 | Taylor et al. | 524/59 |
| 2003/0008932 | A1 | 1/2003 | Soane et al. | 521/56 |
| 2003/0034723 | A1 | 2/2003 | Mehan et al. | 313/318.01 |

OTHER PUBLICATIONS

International Search Report for International Application No. PCT/US2004/025312, mailed Nov. 2, 2004.
Patent Abstracts of Japan, vol. 0102, No. 52 (C-369), Aug. 29, 1986 & Japanese Publication No. JP 61-0178887 A (Shinko Kagaku kogyo KK), Apr. 22, 1986 (abstract only).

\* cited by examiner

*Primary Examiner*—Michael Miggins

(57) ABSTRACT

Provided is a melt composition for a heat shrinkable foam structure that includes at least one base polymer and a blowing agent made from at least one heat-activated chemical compound encapsulated by a plurality of polymeric shells. The melt composition may also include a crosslinking promoter or other additives. Also provided is a method for making a heat-shrinkable polymer foam tubing. A melt composition containing at least one base polymer material having a melt temperature and a blowing agent having an activation temperature is provided. The melt composition is mixed at an elevated temperature. The melt composition is then extruded through a die at a high temperature. The extruded foam tube is then processed, often heat-processed. Additionally provided is a heat shrinkable foamed polymer tube containing an inner layer and an outer layer of an extruded foamed polymer tube, where each layer is made from at least one base polymer and a blowing agent and the blowing agent includes a heat-activated chemical compound encapsulated in a plurality of polymer shells.

7 Claims, 1 Drawing Sheet

HEAT-RECOVERABLE FOAM TUBING

BACKGROUND OF THE INVENTION

1. Field of the Invention

The present application relates to a polymeric foam tubing which can be heat-recovered, e.g. heat-shrunk. More specifically, it relates to an extruded polymeric foam tubing including a dispersed, encapsulated blowing agent.

2. Introduction to the Invention

Insulation, padding or a protective covering is often required for a variety of substrates, such as metallic wires, rods, pipes, or other elongated irregular shapes, such as handles and grips, in a broad range of applications, from tools and appliances to clothing. A foamed polymer coating is an effective and inexpensive method of providing such insulation or padding. In particular, a tubular foam structure can be extruded, and made into a heat shrinkable tubing. When the substrate is inserted into the foam tube and then the tube is heated above the melting point of the polymer used in the polymer composition of the tube, the heat shrinkable polymer foam tubing will recover snugly over the substrate.

Extrusion is a continuous molding process often used with polymer materials. In extrusion, a polymer material is continuously heated and mechanically worked into a homogeneous charge of viscous fluid in the melt phase. Alternatively, the polymer may be introduced into the extrusion device already in a melt phase. The heated charge is then forced through an open-ended die. The polymer is extruded from the die in the general shape of the die; often, it is an annular shape. The extruded melt is then solidified by air cooling or water quenching the extruded material. To make a heat-recoverable article, the solidified material usually is crosslinked, and then mechanically expanded. Applying heat to the expanded article causes it to recover, usually by shrinking, to approximately its original, unexpanded shape.

When a foamed extrudate is desired, the polymer melt is often mixed with a blowing agent. Chemical blowing agents typically are in the form of heat-activated fine powders, such as sodium bicarbonate or azodicarbonamide. When the polymer material containing the blowing agent powder is heated and melted, the bulk of the powder decomposes and forms pockets or balloons of gas within the structure of the polymer melt. The gas immediately dissolves into the polymer melt, and mainly stays dissolved within the melt due to the prevailing high pressure in the extruder at extrusion process conditions. However, in the conventional tube extrusion process of forming a tube of foamed polymer material, some of the dissolved gas is released into the inner cavity of the extruded polymer foam tube as the molten polymeric material exits the die. This can lead to deformities in the shape and dimensions of the final product.

Alternatively, physical blowing agents have been introduced into the polymer melt late in the extrusion process, i.e. after heating the polymer, but before the final pumping of the polymer melt through the extrusion die. Such a process still suffers from the same disadvantages as the previously described conventional process, and variations in polymer foam tube shape and dimensions are still present at unacceptable levels. Further, the foam cell size in the finished product has poor uniformity, which may adversely impact the ability of the tubing to expand in diameter following a crosslinking step.

Accordingly, there is an existing need for a composition for a polymer melt for extrusion to be used in tubing that will create a foamed polymeric material capable of being made into a useful heat shrinkable foamed structure, preferably in a continuous process, such as tube extrusion or parison blow-molding process, but not allow the gases to escape and deform the tubular structure.

BRIEF SUMMARY OF THE INVENTION

According to an embodiment of the present invention, there is provided a melt composition for a heat shrinkable foam structure. The composition comprises at least one base polymer and a blowing agent. The blowing agent itself comprises at least one heat-activated chemical compound with a polymeric shell encapsulating the heat-activated chemical compound.

According to another embodiment of the present invention, there is provided a melt composition for a heat-shrinkable foam structure. The composition comprises about 80 to about 99.9% by weight of an ethylene/vinyl acetate copolymer base polymer, about 0.1 to about 10% by weight of a blowing agent, and, optionally, about 0 to about 19.9% by weight of an optional filler.

According to yet another embodiment of the present invention, there is provided a method for making a heat-shrinkable polymer foam tubing. A melt composition is first provided, which comprises at least one base polymer material having a melt temperature and a blowing agent having an activation temperature. The melt composition is mixed at an elevated temperature. The melt composition is then extruded through a die at a high temperature. The extruded foam tube is then post processed.

According to still another embodiment of the present invention, there is provided a heat shrinkable foamed polymer tube comprising at least an inner layer and an outer layer of an extruded foamed polymer tube. Each layer is made from at least one base polymer and a blowing agent, where the blowing agent comprises a heat-activated chemical compound encapsulated in a polymer shell.

Other aspects of the present invention will become apparent in connection with the following description of the invention.

DETAILED DESCRIPTION OF THE PREFERRED EMBODIMENTS

Figure 1:
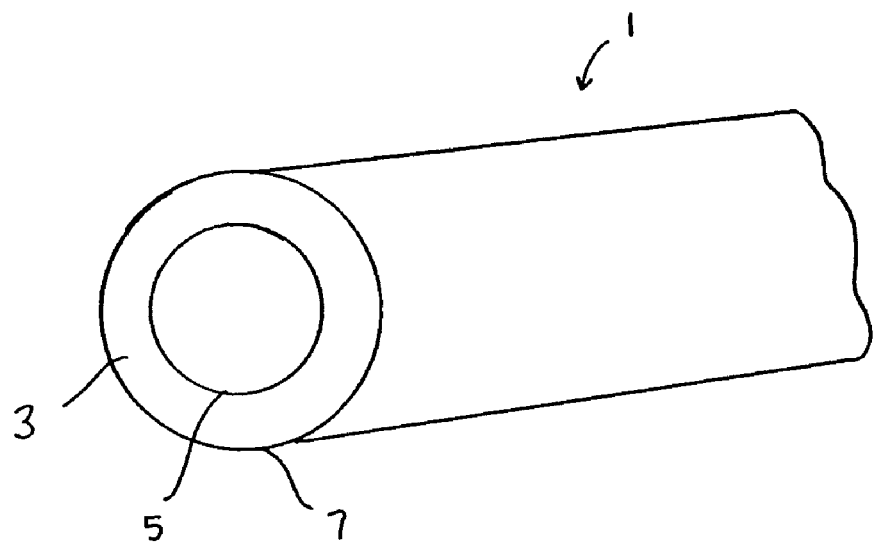
FIG. 1 is a perspective view of the foamed polymer tube of an embodiment of the present invention having an inner surface and an outer surface.

A composition for a foamable polymer according to the invention comprises at least a base polymer composition and a blowing agent. In addition, the composition (also referred to herein as a melt composition) may include optional fillers, e.g., antioxidants, crosslinking promoters, heat stabilizers, colorants, flame retardants, and the like.

The base polymer material of the composition is chosen such that it will melt easily, withstand the heat and pressure of extrusion without degrading, and mix homogeneously with the blowing agent. A thermoplastic polymer fulfills all requirements for a base polymer. Preferred base polymer compositions include, without limitation, polyethylenes, including very low density polyethylene, low density polyethylene, medium density polyethylene, high density polyethylene, and metallocene polymerized ethylene; C4-C10 olefin-containing ethylene copolymers; copolymers and terpolymers of polyethylene with vinyl acetate, alkyl acetate, acrylic acid, maleic anhydride or carboxylic acid; polypropylene; ethylene propylene diene rubbers (EPDM); styrene butadiene rubbers; rubber blends with polyolefins; polyurethanes; polyamides; polyesters; polysiloxanes; fluoropolymers; other thermoplastic polymers; and mixtures of two or more of these. It is often desirable to mix a polymer having a relatively high level of crystallinity with a polymer having a relatively low level of crystallinity in order to achieve specific heat-recoverable properties. One preferred base polymer may be obtained from DuPont, an ethylene/vinyl acetate copolymer (EVA) sold under the tradename Elvax™ 460.

The selection of a base polymer material is dependent on the end use of the product, and any other material or process concerns, as is known to those in the art. For example, a base polymer for use in a tube able to be easily installed at a low heat-shrink temperature and having a comfortable grip, such as high vinyl acetate content (i.e. at least 15% by weight) EVA polymer or an EVA-EPDM polymer blend, might be used to create a guard on an outdoor appliance such as a lawnmower, while a base polymer able to withstand attack by corrosive chemicals, such as a polyvinylidene fluoride/hexafluoropropylene copolymer, may be used to create insulation for a pipe.

The base polymer is generally present at about 80% by weight to about 99.9% by weight of the melt composition, preferably about 90% by weight to about 99.9% by weight of the melt composition.

The invention utilizes a blowing agent in the form of a plurality of polymeric shells encapsulating a heat-activated chemical compound. These capsules are often called microballoons. The chemical compound chosen is preferably a liquid at room temperature, and has a relatively low boiling point, i.e. less than 50° C. The specific chemical compound and polymeric shell materials are chosen such that the polymeric shells remain intact throughout the rigors of extrusion; more specifically, a polymer shell material is chosen such that the shell will not degrade or melt under the heat and pressure used in the mixing process, and will not rupture during the applied forces of the extrusion process.

The microballoons also have an activation temperature at which the encapsulated liquid begins to boil and turn into a gas. At this activation temperature, the polymer shells are soft enough to begin to expand to allow for the increase in volume as the chemical compound enters a gaseous phase while still effectively encapsulating the chemical compound. This expansion of the microballoons forms the voids in the base polymer in order to create a foamed material. Generally the activation temperature comprises a range in order to accommodate differences in microballoon size in a particular batch of product. In addition, encapsulated blowing agents are often defined in terms of a minimum expansion temperature (or temperature range), i.e. the temperature at which the encapsulant begins to expand, and a maximum expansion temperature (or temperature range), i.e. the temperature at which the encapsulant has completed expansion. The activation temperature is generally somewhat lower than the maximum expansion temperature.

The polymeric shell can comprise, without limitation, polymers and copolymers of vinyl chloride, vinylidene chloride, acrylonitrile, methacrylonitrile, styrene, or combinations thereof. Preferably, the polymeric shell encapsulates a hydrocarbon-based liquid such as isopentane or isobutane.

In a preferred embodiment of the present invention, the unexpanded polymer shells preferably have a diameter ranging from about 3 μm to about 60 μm, more preferably from about 6 μm to about 40 μm. The density of the unexpanded encapsulated blowing agent is generally less than 25 kg/m³. The unexpanded encapsulated blowing agent is preferably used at a weight percent of between about 0.1% and about 10% of the melt composition, more preferably between about 1% and about 7% of the melt composition, and most preferably between about 2.5% and about 6% of the melt composition, although the amount of blowing agent used is a function of the type of polymer, the type of blowing agent, and the presence of optional fillers.

One preferred encapsulated blowing agent is Expancel™ polymeric microballoons, available from Expancel, Inc. In general, such microballoons have an unexpanded diameter between about 6 μm and about 40 μm, and an expanded diameter between about 20 μm and about 150 μm. More preferably, the encapsulated heat-activated blowing agent is Expancel™ 091-DU-80 or Expancel™ 092-DU-120, both of which have polymeric shells comprising copolymers of acrylonitrile and methacrylonitrile, and both of which encapsulate isopentane.

Selection of a blowing agent is dependent in part on the base polymer chosen for the application and the processing temperatures used in the extrusion process. There are two important temperature zones in the extrusion or blow-molding process—the mixing or melt blending temperature zone, where melting of the base polymer occurs, and the extrusion die temperature zone. The mixing temperature zone is selected to be at a higher temperature than the melting temperature of the base polymer. The melting temperature is defined as the peak of the endotherm of a differential scanning calorimeter (DSC) trace. When the melt composition comprises more than one polymer and more than one peak is present on the DSC trace, the melting temperature is defined as the highest temperature peak.

In order to create a uniform, stable foam, however, it is preferable that the blowing agent microballoons do not begin to expand until, or just slightly before, the time when the polymer mixture is extruded through the die, and not prematurely. Preferably the blowing agent will be chosen such that its activation temperature is higher than that in the mixing temperature zone, but lower than that in the extrusion die temperature zone. It is therefore preferable to choose a blowing agent with a minimum expansion temperature above the melting temperature of the base polymer, so that expansion does not occur while the base polymer material is melting. More preferably, the chosen blowing agent has a minimum expansion temperature higher than the desired mixing temperature of the melting step of the extrusion process.

In order to produce a heat-recoverable tube, the polymer material is often crosslinked. Crosslinking gives the polymer a "memory" of its current shape, and gives the finished polymer tube the ability to shrink or otherwise change shape upon heating. Crosslinking also increases the structural rigidity of the foamed polymer and assures that the foam will not decompress, or "go flat" when expanded or heat-shrunk. Crosslinking may be achieved by radiation or chemical means, and the polymer mixture may comprise crosslinking agents or promoters to increase the amount of crosslinking between discrete polymer chains. There are two general types of crosslinking promoters—chemical crosslinking promoters and radiation crosslinking promoters. Either or both of these types of crosslinking promoters may be used, although for some preferred embodiments it is preferred that only a radiation crosslinking promoter is used.

A radiation crosslinking promoter acts as a catalyst to polymer crosslinking when exposed to radiation, such as from a high energy electron beam. The radiation crosslinking promoter may be chosen from among those conventionally used to promote crosslinking of polymers, including triallyl cyanurate (TAC), triallyl isocyanurate (TAIC), triallyl trimellitate, triallyl trimesate, tetrallyl pyromellitate, the dually ester of 1,1,3,-trimethyl-5-carboxy-3-(4-carboxyphenyl)indene, trimethylolpropane trimellitate (TMPTM), pentaerythritol trimethacrylate, tri(2-acryloxyethyl) isocyanurate, tri(2-methacryloxyethyl) trimellitate, and the like and combinations thereof. A particularly preferred radiation crosslinking promoter is TMPTM commercially available as Sartomer™ SR 350 from Sartomer Company.

Flame retardants may also be added in an amount as will provide effective flame retardancy for the foamable tube. Suitable flame retardants generally comprise polybrominated aromatics, such as decabromobiphenyl, in combination with inorganic materials, such as antimony trioxide. Other fillers such as antioxidants, adhesion promoters, UV screeners, plasticizers, colorants, heat stabilizers, and other additives may also be employed in conventional amounts. Such additives may be chosen based on the final end use of the product, as is known to those of skill in the art.

The quantity of optional fillers (which in this specification includes both crosslinking promoters and flame retardants, as well as the other fillers and additives referred to above) present in the melt composition is dependent on the type and quantity of base polymer and encapsulated blowing agent, as well as the desired physical properties. In general, the quantity of optional fillers is at most about 35% by weight of the melt composition, preferably at most about 20% by weight of the melt composition, particularly at most about 10% by weight of the melt composition, e.g. about 0 to about 19.9% by weight of the melt composition.

The extrusion process for a foamable polymer according to the present invention is similar to that known to those of skill in the art. The base polymer is first mixed with the blowing agent and other foamable polymer composition elements. Mixing is performed by any method known to those of skill in the art; preferably, mixing occurs by a Banbury type of a mixer. A twin-screw mixing device may also be successfully employed. Mixing occurs at an elevated temperature selected to be high enough that the base polymer will melt during mixing, but not high enough to activate the other components of the polymer mix, such as the blowing agent or any crosslinking promoter, if present. Preferably, therefore, the mixing step takes place at a temperature higher than the melt temperature of the selected base polymer, but below the minimum activation temperatures of the blowing agent.

The mixed polymer blend, in a melt state, is then extruded through a die, as is known in the art. For the present application, the die is preferably an annular or ring-shaped die; however, the die may be of any shape known in the art and preferred for a chosen end result. The temperature of the polymer blend after melting and mixing but before extrusion can be independently set from the temperature at the time and point of extrusion. Preferably, the post-mixing, pre-extrusion temperature is set at a temperature equal to or higher than that of mixing, but less than the activation temperatures of the components in the polymer blend. More preferably, the post-mixing, pre-extrusion temperature is set at a temperature higher than that of mixing, but less than the minimum activation temperatures of the components in the polymer blend. The temperature at the point of extrusion is preferably set well above the minimum activation temperature of at least the blowing agent, i.e. at least 10° C. above. By waiting until just before extrusion to reach a temperature that activates the blowing agent, it has been found that a more stable, uniform foam is created. At the time of activation, the liquid inside the polymer capsules of the blowing agent changes phase into a gaseous state, and the capsule expands to create a gas pocket. The melt composition is thereby preferably formed into the desired shape, e.g. by extrusion, and foamed at approximately the same time. The melt composition leaves the extruding process as a foamed polymer tube that has not yet been expanded in size.

Once the tube has undergone extrusion and foaming, the blowing agent microballoons are in a fully expanded state, and the base polymer is in a melt, i.e. a highly viscous liquid-like state. As the extruded foam tube begins to cool just after extrusion, the polymer begins to solidify around the expanded microballoons. The microballoons are then frozen in an expanded state, creating the voids in the foam.

After extrusion, the foamed polymer tube undergoes post processing, generally including one step that involves exposure to heat. In a preferred first step, the foamed polymer tube can be cross-linked. Depending on the type of crosslinking process used, the tube is irradiated or heated to the proper temperature to activate the chemical crosslinking promoter. Irradiation occurs by any method known in the art, such as high energy electron beam irradiation. The purpose of crosslinking the polymer strands in the foam is to give the tube a "memory" of the current tube shape and diameter as well as structural stability above the melting point of the base resin.

Next, the tube is expanded by any means known in the art, such as shaping on a mandrel or use of a vacuum apparatus. Preferably, the tube is expanded by the process of pressure differential expansion. In pressure differential expansion, the foamed polymer tube is first heated to a temperature sufficient to melt the crystalline polymer regions of the foamed polymer tube. The heated tube is then subjected to a pressure differential along the tube wall while maintaining the elevated temperature. The pressure differential is preferably such that the air pressure within the tube is greater than that outside the tube. Methods for imposing this air pressure differential are known to those of skill in the art. The air pressure differential expands the diameter of the tube. The pressure differential is directly related to the finished expanded diameter of the foamed polymer tube; by adjusting the pressure differential and/or other variables, e.g. the sizing die internal diameter, a desired expanded diameter can be attained.

After the tube has been expanded, and while the pressure differential is maintained, the foamed polymer tube is rapidly cooled if it has been heated during expansion. This rapid cooling freezes the physical polymer foam positions in place in the expanded state. The cooling also serves to solidify the foamed polymer tube. After cooling, the foamed polymer tube will remain in its expanded state until heated again. Once the expanded tube is reheated or "recovered", it will contract back to approximately its original size.

In a preferred embodiment, a multi-layer approach may be used wherein the polymer tube is made from a first, inner layer and a second, outer layer, both made by the process disclosed above. The two layers may be co-extruded. In such an embodiment, the inner and outer layer materials may comprise the same or different base polymer and the same or different blowing agent. The inner and outer layers may have significantly different mechanical properties, or have been foamed to different levels of void content, so as to tailor the overall performance of the product to specific end user needs. For example, an excellent balance of softness, tactile feel, vibration dampening characteristics, mechanical robustness and heat shrink performance attributes is achieved when the inner layer is made from a semicrystalline base polymer material and is foamed to a lower level of void content, while an outer layer is made out of a softer, amorphous or elastomeric, base polymer material blend and is foamed to a higher level of void content. (The void content can be determined by comparing the specific gravity of the melt composition in its unexpanded solid state with the specific gravity of the composition after it has been expanded.) Similarly, a tackifying filler, such as novolak resins, partially polymerized resins, tall oil resin esters, or low molecular weight aromatic thermoplastic resins, may be added to the inner layer. A tackifier increases the adhesive quality of the foam surface, and enhances its adherence to the substrate over which the heat-shrinkable polymer foam would be installed. For many applications, the heat-recoverability performance is enhanced when one of the layers comprises a base polymer having a significant level of crystallinity, e.g. at least 10%.

Additional layers may be present in the polymer tube. For example, a non-foamed adhesive layer, preferably added after the foaming of the tube, may be present on the inner surface of the tube in order to enhance bonding to a substrate. Alternatively, an intermediate layer, either foamed or unfoamed, may be present to provide structural support.

The invention is illustrated by the drawings in which FIG. 1 is a perspective view of foamed tube 1 of the invention in which melt composition 3 in the form of a tube has inner surface 5 and outer surface 7.

Figure 2:
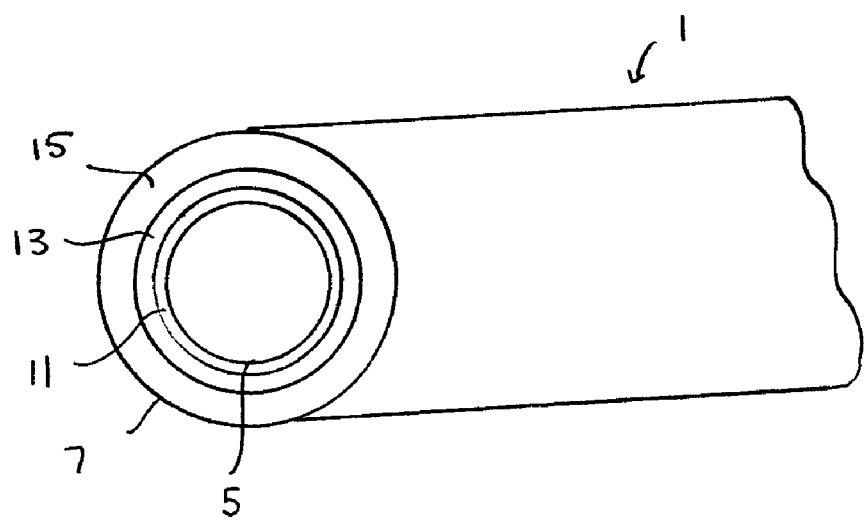
FIG. 2 is a perspective view of the foamed polymer tube of an embodiment of the present invention having an inner and outer layer, with an intermediate layer positioned between the two layers.

FIG. 2 is a perspective view of another foamed tube 1 of the invention. In this embodiment, intermediate layer 13 is positioned between inner layer 11 and outer layer 15.

EXAMPLE

An exemplary formulation for the foamable composition using an encapsulated blowing agent is listed below in Table 1.

TABLE 1

Exemplary Foamable Polymer Tube Composition

| Ingredient Description | Ingredient Product | Supplier | Weight |
|---|---|---|---|
| Base Resin (EVA) | Elvax ™ 460 | Du Pont | 90.5 |
| Encapsulated Blowing Agent | Expancel ™ 092 DU-120 | Expancel Inc. | 3.0 |
| Radiation Crosslinking Promoter | TMPTM | Sartomer | 2.0 |
| Antioxidant | Irganox ™ 1010 | Ciba Specialty Chemicals | 2.0 |
| Heat Stabilizer | Cyanox ™ 1212 | Cytec Industries | 1.0 |
| Colorant (TiO$_2$) | TiPure ™ 101 | DuPont | 1.0 |
| Metal Deactivator | Irganox ™ 1024 | Ciba Specialty Chemicals | 0.5 |
| TOTAL | | | 100.0 |

According to product literature from the supplier, the selected blowing agent, Expancel™ 092 DU-120, had a particle size of 28-38 μm (based on weight average diameter), a minimum expansion temperature of 116-126° C., a maximum expansion temperature of 190-202° C., and a density of less than 14 kg/m$^3$ (based on thermomechanical analysis).

In preparing the exemplary polymer mix for extrusion, the twin-screw mixing mechanism was fitted with a three hole stranding die, with a diameter of about 3.2 mm (0.125 inch). Melting and mixing was carried out between about 95° C. and about 110° C. at a feed rate of about 6.8 kg/hr (15 pounds/hour) while the screws were turning at about 72 revolutions/minute. No foaming was observed in the extruded strands when examined under a 30× microscope.

The compound was then pelletized, and extruded through a 51 mm (2 inch), 24:1 L/D single screw extruder using standard commercially available tooling. The extrusion process parameters used in this embodiment are listed below in Table 2. Care was exercised to expand the microballoons of the blowing agent by heating them above their minimum expansion temperature in the final stages of their travel through the extruder. This was accomplished by raising the temperatures of the extrusion barrel and crosshead containing the die to approximately, but not above, the maximum recommended expansion temperature of the blowing agent. As indicated above, the maximum recommended expansion temperature for the blowing agent in the present exemplary embodiment is between about 190° C. and about 202° C.

TABLE 2

Extrusion Process Parameters

| Process Parameter | Value |
|---|---|
| Extruder Type/Barrel Diameter | Davis Standard/51 mm (2.0 inch) |
| Crosshead Type | Davis Standard |
| Screw Design | low compression ratio screw |
| Extrusion die inner diameter × land length | 9.7 mm (0.38 inch) × 25.4 mm (1.0 inch) |
| Extrusion tip outer diameter × land length | 12.7 mm (0.5 inch) × 27.9 mm (1.1 inch) |
| Water Temperature in cooling trough | 24° C. (75° F.) |
| Vacuum | 27.2 mm (1.07 inch) Hg |
| Trough-Die Distance | 63.5 mm (2.5 inch) |
| Extruder Screw Speed | 16.9 rpm |
| Drive Motor | 5.3 A |
| Extrusion Line Speed | 7.6 m/min (25 feet/minute) |

| Temperatures | Degrees ° F. | Degrees ° C. |
|---|---|---|
| Mixing Temperature | 200 | 93 |
| Extrusion Temperature | 360 | 182 |

The extruded foam tubing, having maintained the internal diameter of the die of about 9.7 mm (0.380 inch), next went through an expansion process. The extruded foam tube was first irradiated with about 6.1 Mrad using a 1.5 MeV electron beam to obtain a crosslinked polymer network in the base resin.

The foamable tubing was then expanded by employing a pressure differential between the inside and outside surfaces of the tubing. In the present exemplary embodiment, the pre-expansion heating took place at a temperature of about 130° C. Next, a pressure differential was imparted across the tubing wall to expand the tubing to an internal diameter of about 20 mm (0.8 inch). While subjected to the differential pressure, the tubing was passed through a cooling zone at a velocity of about 7.6 m/minute (25 feet/minute). Further parameters used in the expansion process of the exemplary embodiment are listed below in Table 3.

TABLE 3

Expansion Details

| Glycerin Bath Temperature | 107° C. (225° F.) |
|---|---|
| Tank Plug Die Type | 12.1 mm (0.475 inch) |
| Tank Pressure | 72.4 kPa (10.5 psi) |
| Tube Pressure | 89.6 kPa (13 psi) |
| Line Speed | 9.93 m/min (32.6 ft/min) |
| Tank to Sizing Die Gap Setting | 2.54 mm (0.100 inch) |

Table 4 below gives the detailed mechanical characteristics of a finished product made by this exemplary procedure.

Upon heating of the expanded foamable polymer tube, the tube recovered back to approximately the original extruded inside diameter.

TABLE 4

Product Characteristics

| | |
|---|---|
| Expanded Inside Diameter | 18.3 ± 0.5 mm (0.720 ± 0.020 inch) |
| Expanded Wall Thickness | 0.64-0.74 mm (0.025-0.029 inch) |
| Extruded Inside Diameter | 8.26 mm (0.325 inch) |
| Extruded Wall Thickness | 1.60-1.75 mm (0.063-0.069 inch) |
| Recovered Inside Diameter (150° C. for 3 min) | 9.1 mm (0.357 inch) |
| Recovered Wall Thickness (150° C. for 3 min) | 1.78-1.96 mm (0.070-0.077 inch) |
| Longitudinal Change in length (150° C. for 3 min) | −4.0% |
| As Extruded Specific Gravity | 0.42 g/cm$^3$ |
| As Extruded Percent Air Voids | 56% |
| As Expanded Specific Gravity | 0.47 g/cm$^3$ |
| As Expanded Percent Air Voids | 52% |
| As Recovered Specific Gravity | 0.35 g/cm$^3$ |
| As Recovered Percent Air Voids | 66% |

It is therefore intended that the foregoing detailed description be regarded as illustrative rather than limiting, and that it be understood that it is the following claims, including all equivalents, that are intended to define the spirit and scope of this invention.

What is claimed is:

1. A heat shrinkable foamed polymer tube consisting essentially of
   (A) a first layer of an extruded foamed polymer tube, said first layer being an inner layer of said tube, having a void content and comprising
      (1) at least one base polymer; and
      (2) a blowing agent, said blowing agent comprising:
         (a) a plurality of polymeric shells; and
         (b) at least one heat-activated chemical compound, said heat-activated chemical compound encapsulated in said polymeric shells, and
   (B) a second layer of said extruded foamed polymer tube, said second layer being an outer layer of said tube in contact with the first layer, having a void content and comprising
      (1) at least one base polymerdifferent than the base polymer of the first layer; and
      (2) a blowing agent, said blowing agent comprising:
         (a) a plurality of polymeric shells; and
         (b) at least one heat-activated chemical compound, said heat-activated chemical compound encapsulated in said polymeric shells.

2. The heat shrinkable foamed polymer tube of claim 1, wherein said base polymer of said inner layer comprises a semicrystalline material.

3. The heat shrinkable foamed polymer tube of claim 1, wherein said base polymer of said outer layer comprises an elastomeric material.

4. The heat shrinkable foamed polymer tube of claim 1, wherein the void content of said outer layer is greater than the void content of said inner layer.

5. The heat shrinkable foamed polymer tube of claim 1, wherein the inner layer and the outer layer are co-extruded.

6. The heat shrinkable foamed polymer tube of claim 1, wherein said inner layer further comprises a tackifying filler material.

7. The heat shrinkable foamed polymer tube of claim 6, wherein said tackifying filler is selected from the group consisting of novolak resins, partially polymerized resins, tall oil resin esters, and low molecular weight aromatic thermoplastic resins.

* * * * *